INVENTORS
CONKLING CHEDISTER
BY RONALD K. CHEDISTER
Mason, Fenwick, Lawrence ATTORNEYS

DRIVER TRAINING AND TESTING EQUIPMENT

Filed Sept. 13, 1957 5 Sheets-Sheet 2

INVENTORS
CONKLING CHEDISTER
BY RONALD K. CHEDISTER
Morgan, Finnegan, Durham & Pine
ATTORNEYS.

DRIVER TRAINING AND TESTING EQUIPMENT

Filed Sept. 13, 1957 5 Sheets-Sheet 3

INVENTORS
CONKLING CHEDISTER
RONALD K. CHEDISTER
BY Morgan, Finnegan, Durham & Pine
ATTORNEYS.

INVENTORS
CONKLING CHEDISTER
RONALD K. CHEDISTER
BY Morgan, Finnegan, Durham & Pine
ATTORNEYS.

DRIVER TRAINING AND TESTING EQUIPMENT

Filed Sept. 13, 1957 5 Sheets-Sheet 5

INVENTORS
CONKLING CHEDISTER
RONALD K. CHEDISTER
BY Morgan, Finnegan, Durham & Pine
ATTORNEYS.

3,015,169

DRIVER TRAINING AND TESTING EQUIPMENT

Conkling Chedister, 330 E. Cedar St., Livingston, N.J., and Ronald K. Chedister, 12 Pine St., Chatham, N.J.
Filed Sept. 13, 1957, Ser. No. 683,814
23 Claims. (Cl. 35—11)

This invention relates to instructing and testing devices, and more particularly to apparatus for the group instruction and testing of individuals in the operation of a plurality of controls, such as the controls of an automobile.

In the past, apparatus for teaching the operation of a plurality of controls was adapted for use with only a single person where a record was desired to show what response was made. Until recently no means was provided for measuring or recording any of the responses of any one or more of a group of subjects simultaneously subjected to a series of stimuli. This was especially true with a group subjected to a rapid series of stimuli or to stimuli which call for nicely coordinated or timed responses. Thus it was impossible for the instructor, tester, or supervisor to make any accurate or permanent observation of the results of the various subjects in the group. This problem was solved by the apparatus disclosed in the co-pending United States application, Serial No. 385,401, filed October 12, 1953, now Patent 2,870,548 which measures and records the timed or coordinated responses of each member of a group to a series of stimuli.

In general, the apparatus disclosed in the co-pending application comprises a central recording and control unit and a plurality of individual control units interconnected, so that in response to stimuli presented in series from the central control unit, selective operation of the controls of the individual control units causes a corresponding record to be made showing the manner in which the appropriate control at each individual unit was operated, and whether or not it was operated correctly or in accordance with a predetermined standard.

The central control unit includes a stimulus generator, such as a motion picture projector to project a moving picture on a screen in front of the subjects to be tested, and the film projected includes a predetermined series of stimuli such as the various traffic hazards and incidents which might be encountered in travel on a highway. Thus in a projected sequence showing an automobile traveling along a street, a traffic light may change from green to red requiring a stop, or from red to green requiring the starting of the vehicle; the road may curve, requiring steering; in starting, clutch, accelerator and gear-shifting operations are required; in shifting, proper sequence of clutch, accelerator and gear shift lever are required; in stopping, the brake should not be applied too hard; in turning, the directional signal should be used; some situations may require use of the horn; and on completing the sequence, the ignition switch should be locked and the hand brake set.

At the central control unit are conditioning means including operated means and automatically operated means, one of which is selected to condition various circuits in the individual control units, so that switches in each individual control unit may be operated effectively by the subjects being tested. Where the conditioning means are to be automatically operated, they are actuated from the film. More particularly, the film actuates a switch which causes a stepped advance of a stepping switch which in turn controls selected ones of a series of relays at the individual control units. Actuation of the relays permits effective operation of the various controls by the subjects being tested.

Each of the individual control units comprises a group of control members to be actuated by the person in response to the stimuli observed or received by him. Each of the individual control units may comprise a driver's seat, a steering wheel, a brake pedal, an accelerator, a parking brake lever, a horn switch, a clutch pedal and a gear shift lever. Other less essential parts may be included such as an "ignition" switch, a speedometer, a directional signal switch and a starter switch, the choice of these parts depending on what equipment is usually provided in an ordinary vehicle and is desired to be taught or tested as to its operation by the subjects.

Also included in each of the individual control units are switches actuated by the operation of each of the control members. For example, the steering wheel is preferably provided with switches responsive to its being turned to the right or left or remaining in a straight-ahead position. The brake pedal operates a switch on being depressed, and a second switch if it is depressed fully. The accelerator pedal controls the speed of a small motor which is loaded to closely follow the action of the accelerator pedal. The clutch pedal simulates control of the load applied to the motor. Speed-responsive switches controlled by the motor respond to the coordinated operation of the accelerator, shift, and clutch pedal. At the same time a speedometer is driven according to the operation of the motor. The switches are connected, in accordance with operation of the conditioning means in the central control unit, through conductors and relays to actuate recording members of a recording mechanism conveniently located in the central control unit. The recording mechanism produces a record of the response of each individual to the several stimuli presented.

The recording mechanism includes means for feeding a record medium by recording members. Indicia related to the individual responses of the several subjects to the series of stimuli are recorded on different portions of the record medium to permit determination of the response of each subject to each stimulus. The record medium, preferably a relatively large sheet, is divided into a number of columns, each of which corresponds to a particular subject. Along each column are provided spaces for the record of the subject's responses to each of the several stimuli corresponding to each situation of the test series. Thus the record medium when completed may be scanned in one direction to learn what was done by all of the individuals in response to a particular situation. The operated controls corresponding to each of the four indicia for each situation are identified by a preprinted legend in a column on the record medium.

While the apparatus disclosed in the co-pending application works extremely well, it created a demand for an even better device which would be less complex in construction, thereby reducing cost and maintenance and improving reliability, which would permit the testing of responses to different and varied sequences of situations, and which would permit a more flexible identification of the recording of the subject's response to stimuli.

Therefore, it is a general object of the invention to provide an improved device for training each individual of a group to operate a plurality of controls.

Another general object of the invention is to provide an improved device for testing the operation of a plurality of controls by each individual in a group.

Another object of the invention is to provide an improved training and testing device which requires a minimum of wiring, maintenance and repair.

A further object of the invention is to provide an improved device for indicating the response of tested subjects to changeable sequences of situations.

Still another object of the invention is to provide an improved device which permits the testing and recording of responses to any of a number of sequences of situations.

Relays used in the apparatus of the co-pending application are control elements which under practical operating conditions are a frequent source of trouble because of corrosion and oxidation of contacts, spring weakening and failures, etc. Moreover, relays are rather large in size and have a relatively expensive unit cost. Especially when the number of switching circuits requiring control elements becomes fairly large, the space and cost factors associated with relays must be recognized.

Therefore, it is another object of the invention to provide an improved trainer and testing device having switching means which are less expensive to install and which occupy a smaller space.

It is a further object of the invention to provide an improved trainer with switching means which minimize the interconnections between the central control unit and the individual control units.

Other objects of the invention will be obvious or may be learned by practising the invention, the same being realized and attained by means of the combustions, improvement and instrumentalities pointed out in this specification and in the appended claims.

The invention consists of the novel parts, constructions, arrangements, combinations and improvements herein shown and described.

Briefly, in accordance with one feature of the invention, apparatus is provided which comprises a central control unit and a plurality of individual control units. The central control unit includes a master control unit which receives signals from a stimuli generator (such as a film projection system) or from manually operated switches. In each individual control unit is a rotary switching means. During the presentation of a situation, when the stimuli are generated, the master control unit transmits signals to the rotary switching means in each of the individual control units. The rotary switching means are activated to connect to the central control unit, switches activated by the operation of those controls which, in accordance with the particular stimulus being generated, should be actuated by the subject. The responses of the individuals are recorded at the central control unit.

It should be noted that the rotary switching means include contacts that are wiped against each other. Thus clean contacting surfaces are always present, and therefore faulty connections are prevented.

Another feature of the invention is a means for rapidly and positively identifying control manipulation indicia which represent the record of the individual's manipulation of the controls. As the control manipulation indicia are recorded on the record medium, an indicia identification means records a combination of identifiers adjacent to the control manipulation indicia. The master control unit controls the indicia identification means in the selection of the combination of identifiers, while at the same time controlling the rotary switching means in each individual control unit. While the rotary switching means are establishing the connections between the selected controls and the central control unit, the indicia identification means is selecting the combination of identifiers corresponding to these controls. Thus it is possible to dispense with a preprinted record medium and permit a more flexible means for testing a subject's response to stimuli so that the sequence of testing situations need not conform to a preprinted pattern.

Another feature of the invention concerns the indicia-identification means. The indicia-identification means includes a printing disk for printing different combinations of identifiers, each identifier corresponding to one of the control members. Rotary-drive means, under the control of the master control unit, rotate the printing disk to a predetermined position related to the operaion of the control members being tested. After the predetermined combination of identifiers is in position, the combination is recorded on the record medium.

A further feature of the invention is a means for selecting one of a group of sequences in which the manipulation of various control members is tested. During automatic operation when the manipulation of various control members is tested in accordance with a given sequence of situations, it is necessary that the control circuits in the individual control units be properly conditioned in synchronism with the presentation of the situations. To this end a stepping switch is employed which has a plurality of segments. Each segment corresponds to a particular sequence, and the fixed contacts of each segment correspond to the situations in a particular sequence. Thus when a sequence is presented, the segment of the stepping switch corresponding to that sequence is energized by a power-switching means, and as the series of situations is presented, a rotary contact of the stepping switch advances in synchronism with the sequence, thus causing, in conjunction with other circuits, the proper conditioning of control members in individual control units. For a different sequence, the power-switching means energizes a different segment of the stepping switch.

A further feature of the invention is programming means for varying the operation of the device to accommodate any predetermined combination of situations in a given sequence. The connections from particular contacts of any segment of the stepping switch to the circuits which condition the various controls are determined by the programming means. Thus any combination of situations may be utilized in a particular film sequence, since proper control conditioning is achieved by selection of the proper programming means.

The invention in its broader aspects is not limited to the specific combinations, improvements and instrumentalities described, but departures may be made therefrom within the scope of the claims without departing from the principles of the invention and without sacrificing its chief advantages.

In order to illustrate the possibilities of carrying out the invention without thereby in any way restricting the scope of the invention, the preferred embodiment of the invention will be shown by way of example only in connection with driver training and testing equipment of the type disclosed and claimed in the above-cited United States patent application. However, it should be noted that the invention is equally applicable to other types of training and testing equipment.

Other objects, features and advantages of the invention will be apparent from the following detailed description which serves to explain the principles of the invention when read together with the accompanying drawings which constitute a part hereof and wherein.

It will be understood that the foregoing general description and the following detailed description as well are exemplary and explanatory of the invention but are not restrictive thereof.

Figure 1:
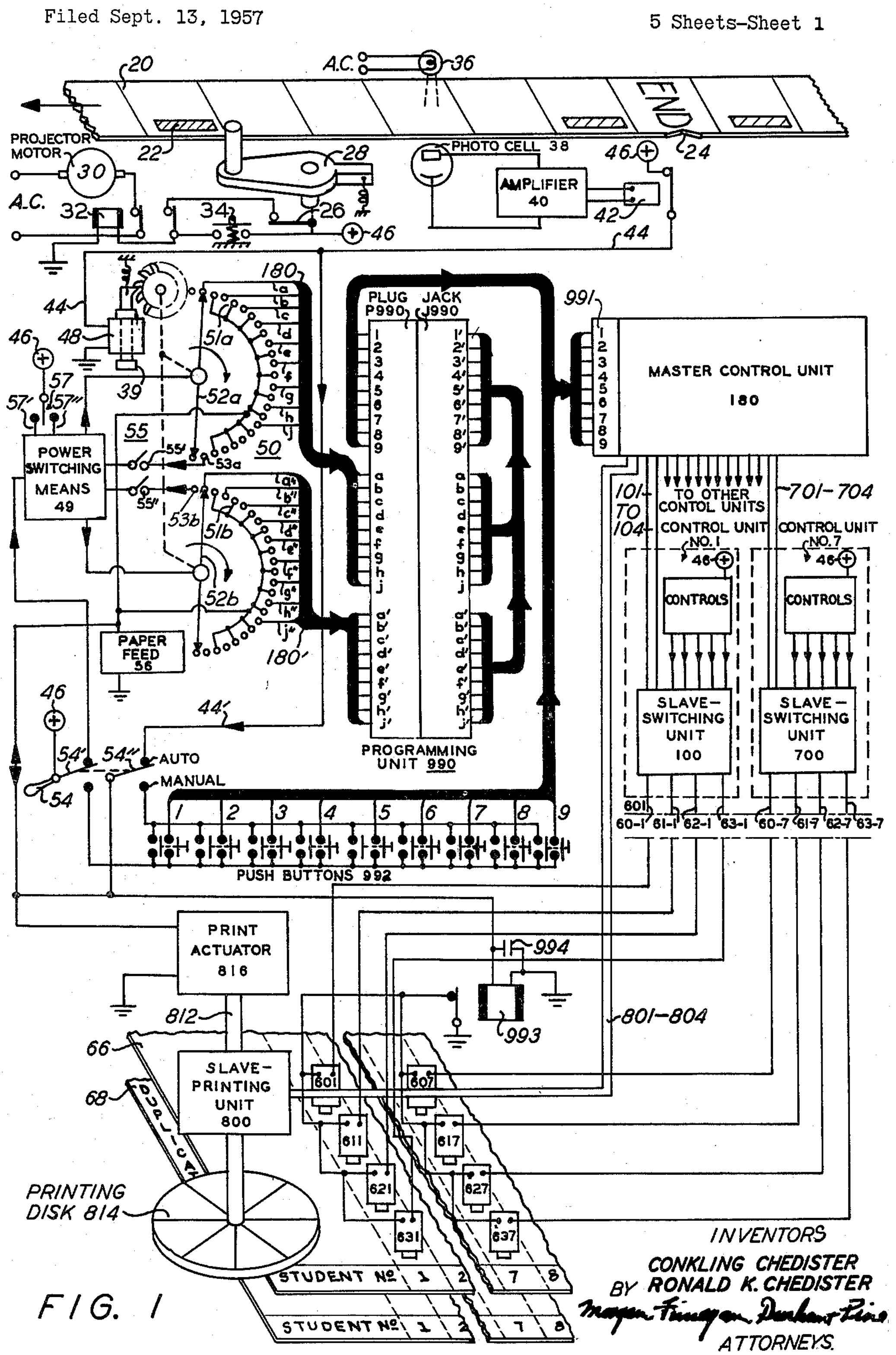
FIGURE 1 is a schematic diagram in accordance with a typical and illustrative embodiment of the invention, which shows the individual control units, and the central control unit which includes the master control unit, for the simultaneous testing of a group in the driving of an automotive vehicle.
Figures 2, 3:
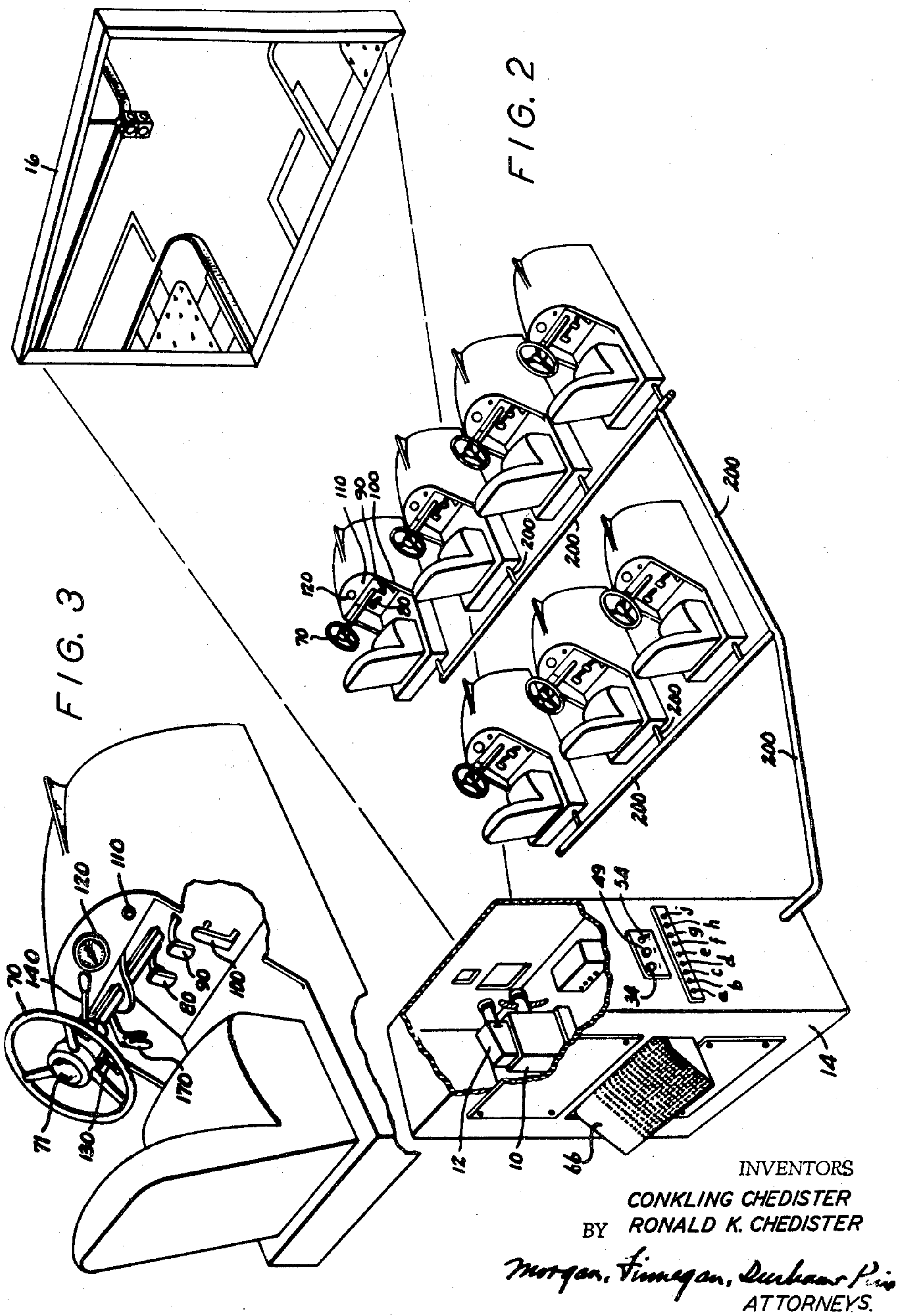
FIGURE 2 is a schematic and perspective view of a typical and illustrative embodiment of the present invention to show the overall orientation and interdependence of the central control unit (including screen) and the individual control units especially adapted for the simultaneous instruction of a group in the driving of an automobile.
FIGURE 3 is a detailed perspective view of one of the individual control units shown in FIGURES 1 and 2.

Referring now in detail to the present preferred and illustrative embodiment of the invention as shown, particularly in FIGS. 1 and 2, the apparatus is conveniently divided into a plurality of units, such as the central control unit which includes the projector and recording means, a projecting screen on which the projected images are shown for viewing, and a plurality of individual control units at each of which is seated a subject to operate his several controls. The actuation of these controls causes indicia to be recorded on a record medium at the central control unit.

The projection unit comprises a motion picture projector 10 (FIG. 2) and a changeable slide projector 12, suitably mounted in a casing 14. Both are adapted to project images on a screen 16. The projectors 10 and 12 and the screen 16 are located adjacent to opposite sides of a dimly lighted room.

The motion picture projector 10 is preferably a continuous projector so that the film may be repeatedly projected without rewinding. Such a film contains a sequence of situations following each other in a logical order; for example, the putting of an automobile in motion on a highway followed by turning corners, the viewing of traffic lights, pedestrians, and stopping. Another more elementary sequence is the starting of the motor, the releasing of the parking brake, the depressing of the clutch, the shifting into gear and eventually into high with the coordinated actuation of the accelerator, and finally the stopping of the car. Using the controls or control members provided and relating these to normal driving conditions, a wide variety of situations may be simulated and combined in different orders to present the majority of traffic incidents on the screen 16.

The passage of the film through the motion picture projector 10 causes actuation of various control circuits to condition the sensing of the actuation of selected controls by each of the individuals viewing the projected picture. Different portions of the film cause the conditioning of different selected controls or combinations of controls. A power-switching means is provided for adapting the conditioning of controls to any one of a group of sequences. Also included is a programming means to adapt the conditioning circuits to any combination of situations comprising one particular film sequence. Other control circuit conditioning means are provided for the arbitrary manual operation by the instructor to permit the repeated or random presentation of situations.

The slide film projector 12 is provided so that stationary scenes or instructions may be projected on the screen 16 in timed relation with the conditioning of the control circuits and under control of the motion picture film or for use with the arbitrary circuit selection by the instructor.

The motion picture projector 10 is driven by an electric motor 30 (FIG. 1) supplied with power through a holding relay 32 which is closed by means of pushbutton 34 (normally open) and held in energized position by one of its own contacts and by switch 26 (normally closed). Switch 26 is actuated by arm 28 which engages the edge of the film 20. When pushbutton 34 is closed, the electric motor 30 starts moving the film 20 until arm 28 engages a notch 24 in the film edge, whereupon the motor 30 is stopped.

The light from an exciter lamp 36 passes through the edge of the film 20 to excite a photocell 38, except when the light is interrupted by passage of one of the opaque spots 22. The output of the photocell 38 is amplified by an amplifier 40 to control relay 42 which connects line 44 to a source of power 46. Whenever the light from the exciter lamp 36 is interrupted by a spot 22, there is a momentary interruption of the power supplied to solenoid 48 of the rotary stepping switch 50 to cause a one-step advance.

An alternative system which may be used provides for the actuation of the rotary stepping switch 50 by means of switches actuated by notches in the film in a manner similar to the function of the aforementioned arm 28 and notch 24.

The stepping switch 50 has in the present embodiment a first and second segment of fixed contacts **51*a* and 51*b*, and a pair of ganged rotary contacts 52*a* and 52*b* respectively associated with the first and second segments. Of course combinations of more segments may be readily employed. The rotary contacts 52*a* and 52*b* are sequentially stepped from fixed contact to fixed contact. The rotary contacts 52*a* and 52*b* are coupled to the power-switching means 49, and are selectively supplied power from the source 46 by the manual switch 54. The power-switching means 49 are bistable switching means such as a relay with holding contacts which when in one state connects power to the rotary contact 52*a*, and when in the other state connects power to the rotary contact 52*b*. If more than two stepping switch segments are used, well-known, multi-stable devices may be used as power-switching means. The power-switching means 49 are initially set in either of the two states by operating the single-pole, double-throw switch 57. Thus at one time either one of the banks of contacts 51*a* or 51*b* is sequentially fed power. The power-switching means 49 changes state upon receipt of a signal from a moving contact of the ganged switch 55**.

Alternate contacts of fixed contacts **51*a*, 51*b* of the stepping switch 50 correspond to the conditioning of various combinations of controls, and are connected via the programming unit 990 to the master control unit 180 to condition the slave-switching units 100—700, each of the control units Nos. 1–7 being provided with a slave-switching unit. The switch contacts 51*a*, 51*b* and alternates therebetween in each segment, in general, alternate between the master control unit 180 to condition different groups of controls and the paper feed 56 for advancing the record medium after each recording operation. Fixed contacts 53*a* and 53*b* of the stepping switch 50 are coupled to the fixed contacts 55′ and 55″ respectively of the ganged switch 55**.

The combination of the segments of fixed contacts **51*a* and 51*b*, the power-switching means 49, the ganged switch 55, the single-pole, double throw switch 57, and the programming unit 990 permit flexibility in the presentation of sequences of situations. For example it is possible to test for the manipulation of controls in response to either of two sequences of situations, or to a sequence which contains both, or to entirely different sequences. Of course, the film 20 is positioned in the projector 10** at the appropriate start of the sequence.

When the first of the two sequences is chosen for presentation, the ganged switch 55 is opened and the single-pole double throw switch 57 is thrown to connect power to the contact 57′. This puts the power-switching means 49 in the state which feeds power to the rotary contact **52*a*. As each situation is presented the rotary contact 52*a* steps along each of the fixed contacts 51*a*, activating the master control unit 180 to condition corresponding controls, and in alternate positions activating the paper feed to position the record medium. Nothing occurs when the rotary contact 52*a* contacts the fixed contact 53*a*, since the ganged switch 55** is open.

Similarly when the second of the two sequences is chosen for presentation, the ganged switch 55 is opened and the single-pole double throw switch 57 is thrown to connect power to the contact 57″. This puts the power-switching means 49 in the state which feeds power to the rotary contact 52*b*. As each situation is presented, the rotary contact 52*b* steps along to contact each of the fixed contacts 51*b* to activate the master control 180 to condition corresponding controls.

When both sequences are combined, the ganged switch 55 is closed. Initially the power-switching means 49 may be in either state. If the first of the two sequences is to be presented first, then the single-pole double throw switch is connected to the contact 57′, and the power-switching means 49 feeds power to rotary contact 52*a*. The rotary contact 52a steps along the fixed contacts 51*a* sequentially feeding power to the lines 180 *a–j*. Upon reaching the fixed contact 53*a*, power is fed to the power-switching means 49 which, after a predetermined time, switches power from the rotary contact 52*a* to the rotary contact 52*b*. The rotary contact 52*b* steps along the fixed contacts 51*b* feeding power to the lines 180′ "*a–j*" in a different sequence. Upon reaching the fixed contact 53*b*, power is again fed to the power-switching means 49 which after a predetermined time switches power to the rotary contact 52*a*. If the second of the two sequences is to be presented first, the single-pole double throw switch 57 is placed in the 57″ position and power is fed to the rotary contact 52*b*.

It should be noted that immediately following the opaque spot 22 that caused one rotary contact 52*a* or 52*b* to contact its associated fixed contact 53*a* or 53*b* is a second opaque spot 22. The second opaque spot causes the immediate stepping of both of the rotary contacts 52*a* and 52*b* off the fixed contacts 53*a* and 53*b*. Since there is a delayed switching of power by the power-switching means 49, power is not applied to the other rotary contact 52*a* or 52*b* until the rotary contacts have stepped past the fixed contact 53*a* or 53*b*.

Thus each bank of fixed contacts 51*a*, 51*b* alternately feeds power to the master control unit 180 via the programming unit 990. It is possible therefore to present any sequence or an aggregate sequence which is a combination of the two separate sequences.

While the function of the power-switching means 49 is to permit selection of a particular sequence or combination of sequences, the programming unit 990 permits the setup of any combination of situations in a single sequence.

Basically the programming unit 990 provides a convenient method of varying the connections from the stepping switch 50 to the master control unit 180, thus adapting the control conditioning function to any desired sequence comprising any desired combination of stimuli situations. Thus, to adapt the conditioning function to a particular sequence, a jack J990 is wired so that the connections from the stepping switch 50 to the master control unit 180 provide the proper sequence of control conditioning. If a different sequence is to be presented it is only necessary to replace jack J990 with another jack of the same physical structure but having different connections from the pins J990 *a–j* and from J990 *a′–j′* to the pins J990 1′–9′. In this manner, jacks can be wired for any sequence; the changeover is simply effected by a substitution of jacks; the wiring between the stepping switch 50 and the plug P990 and between the plug P990 and the plug 991 of the master control unit need not be altered.

An illustrative connection for a particular jack J990 might be as follows: from stepping switch 50, line 180*d*, to P990*d*, thence to J990*d*, thence to J990–2′ thence to P990–2, and finally to 991–2 of the master control unit.

A series of manually operated switches is also provided to condition the master control unit 180 in any desired or arbitrary sequence and at any desired time. For this purpose the series of normally open, manually closed pushbutton switches 992, 1 through 9, are individually connected to the master control unit 180 and are supplied with power through a common line which is connected to a source of power 46 by the manual switch 54′ when it is in the manual position. When a pushbutton is closed the master control unit 180 conditions one particular group of controls. When a pushbutton is released, the circuit from power source 46 to the paper feed 56, via the second pushbutton contacts, is broken, thereby actuating the paper feed 56 in preparation for the next test.

Each of the individual control units is provided with a set of controls operated by the subject and, in addition, an individual slave-switching unit 100—700. The slave-switching units 100—700 are basically remotely controlled rotary switches. Under control of the master control unit 180, the slave-switching units 100—700 function to condition the controls so that operation of the proper controls by a subject results in the transmission of a signal from the power source 46 through the circuits of the actuated controls and the slave-switching unit 100—700 to the recording units 601, 611, etc.

More specifically, to a particular film situation which calls for operation of, say, the horn and brake, there corresponds a particular fixed contact of the stepping switch 50. When the rotary arm 52 of the stepping switch 50 reaches this particular contact, the master control unit 180 is energized and rotates to a corresponding position. The slave-switching units 100—700 under the control of the master control unit 180 also rotate to a related position. When the slave-switching units 100—700 are in this related position, the circuits actuated by the horn and brake are connected to the recording mechanism. Thus the operation of the horn and brake will cause the recorders to be actuated to indicate proper response to the presented situation. The operation of controls other than the horn or brake will not result in a correct response because the other control circuits are open.

The recording mechanism comprises a plurality of control manipulation indicia recorders 601, 607, 611, 617, etc., and the identifier printing unit consisting of the print actuator 816, the slave printing unit 800, and the printing disc 814. As is shown, recorders 601, 611, 621, 631 serve for control unit No. 1; 607, 617, 627, 637, for No. 7. The recorders 601 . . . 631 serve to record the current impulses transmitted from the terminals 60–1 to 63–1 by the subject at control unit No. 1, etc. The recorders corresponding to each of the individual control units operate similarly.

Included in the recorder circuit are relay 993 and capacitor 994. When the relay 993 is de-energized, its contacts complete a circuit from each recorder solenoid to the grounded side of power source 46, the other side of the recorder solenoids being connected to the high side of power source 46 when the controls in the individual control units are properly actuated.

The function of relay 993, capacitor 994, and the related circuitry is to prevent improper actuation of the recorders caused by the coupling to the recorder solenoids of transient current pulses generated by the slave-switching units 100—700 when cycling to a new position. Thus when cycling occurs during automatic operation, the relay 993 is actuated by the connection from its winding to power source 46 via the "auto" position of the switch 54″, line 44′, which is energized during automatic cycling. During manual operation the relay 993 is energized from the power source 46 via the manual position of the switch 54′, the pushbuttons 992, and the manual position of switch 54″.

Since the pushbuttons and stepping circuit transmit only transient current pulses to the relay 993, the capacitor 994 is connected in parallel with the coil of relay 993 to maintain the relay energized a predetermined period of time after the occurrence of the transient pulse, during which time the slave-switching units are cycling.

The control manipulation indicia recorders 601 etc. are arranged in four banks of seven each, although these numbers are illustrative only and more or fewer banks, each of more or less than seven, may be used in the same manner. The several control manipulation indicia recorders for each individual subject are preferably aligned with each other so that they may all print in a single column, one such column being provided for each individual subject.

Each of the control manipulation indicia recorders 601 etc. may be a solenoid having an armature movable by the electromagnetic force into contact with a sheet of paper 66 and normally held retracted from the paper, as by a spring, the end of the armature adjacent the paper being provided with a marking member, such as inked felt or crayon, for making marks on the paper sheet 66 as the sheet is supported on a flat surface.

Figure 6:
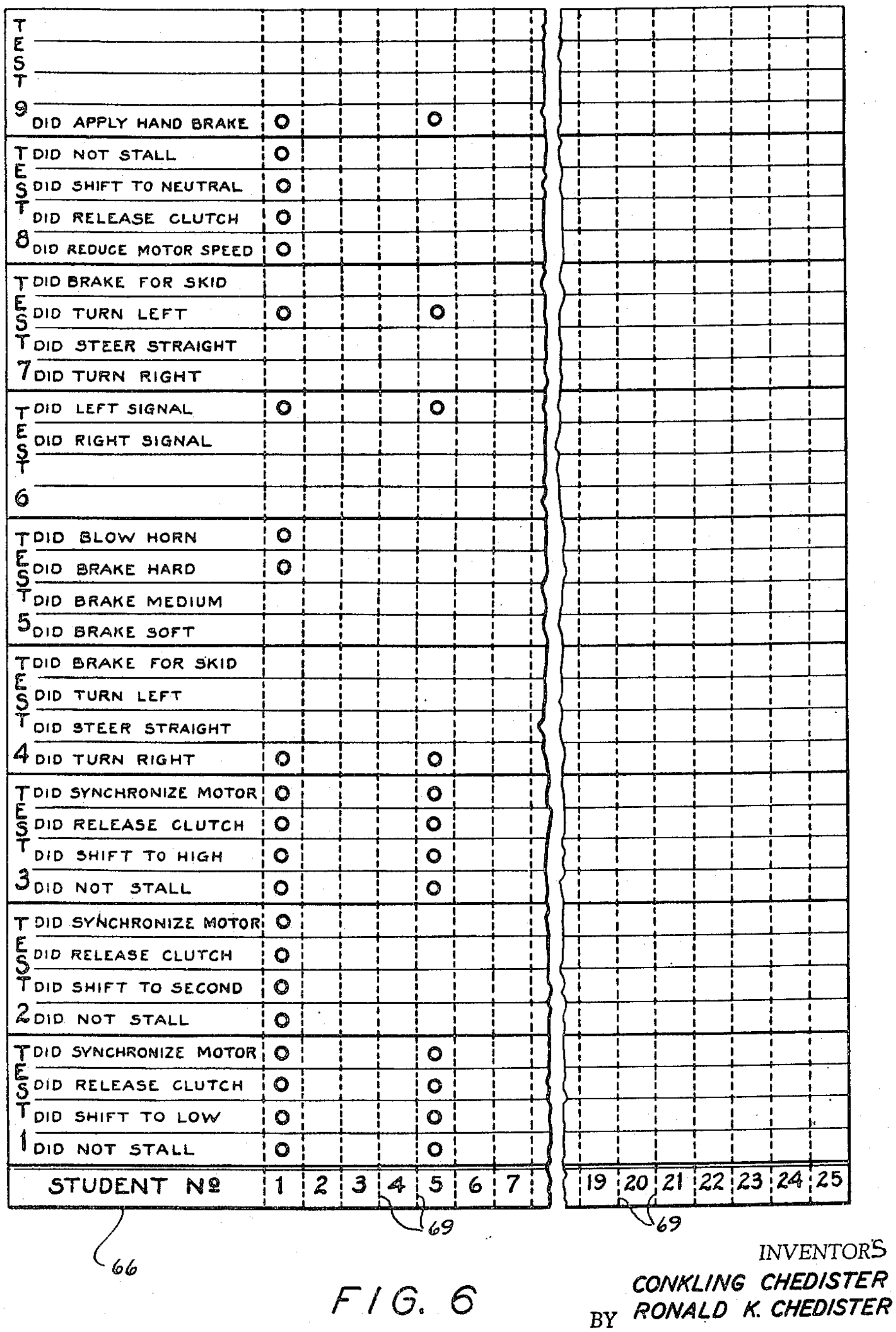
FIGURE 6 is a fragmentary, plane view of a record sheet adapted to be used as the record sheet in the central control unit of FIGURES 1 and 2, showing the manipulative control indicia as circular marks together with the printed identifiers.

The record medium comprises a sheet of paper 66 which may conveniently be backed by a second or duplicate sheet 68 in register therewith, sheet 66 being printed with carbon or transfer compound on its under surface. Each of the sheets 66 and 68 is divided into a number of vertical columns (FIG. 6), one for each of the individual control units Nos. 1 to 7 or more, and provided with horizontal columns in groups of four for each of the several tests to be performed.

Thus, conveniently, there may be nine tests for nine combinations of controls, with four possible record indicia for each test. At one side margin of the sheets 66 and 68, space is provided for printing a key word or identifier for the significance of a mark opposite that identifier. Thus the mark in the lowest horizontal column (FIG. 6) shows that pupils 1 and 5 did not stall the motor on test No. 1. The vertical columns are preferably separable from each other by means of the perforations 69 on one or both sheets 66 and 68, so that the instructor may separate sheet 66 into columns for distribution to the individual members of the class and retain the sheet 68 for his permanent record.

The slave printing unit 800 of the identifier printing unit is coupled by a shaft 812 to the printing disc 814. The print actuator 816 may be employed to drive the printing disc 814 against the record sheets 66 and 68. Upon the face of the printing disc 814 opposite the record sheets 66 and 68 are type faces representing the identifiers. The type faces are located along angularly displaced radial lines. During the testing for the operation of a particular group of controls, the master control unit 180 under the direction of the stepping switch 50 or the pushbuttons 992 (1–9) transmits signals related to the group of controls associated with the test. The signals are received by the slave-switching units 100 to 700 to condition the selected group of controls, and by the slave printing unit 800 to select the identifiers associated with the group. The slave printing unit 800 rotates the shaft 812 until the proper key words are aligned for printing on the record sheet; then the print actuator 816 is energized to identify the test. The identifier legends are printed in the margin on the same lines as the control manipulation record indicia. Thus the record indicia are identified. This type of identification permits a very flexible sequencing of the testing of the manipulations of the combinations of controls, because the master control unit 180 can position the printing disc 814 via the slave printing unit 800 to any predetermined position. Thus the sequencing need not conform to a preprinted schedule of identifiers.

Figure 4:
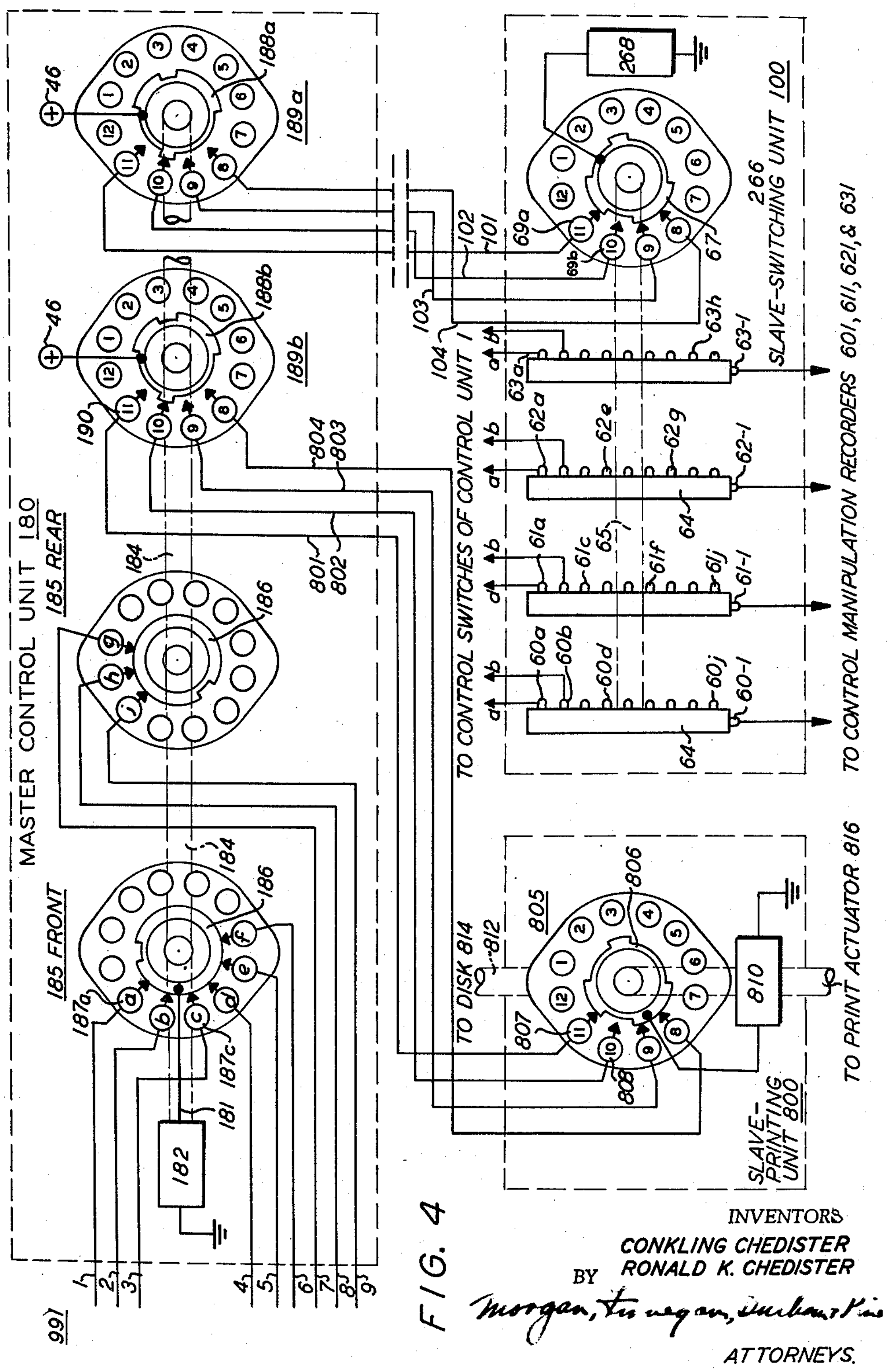
FIGURE 4 shows in greater detail the master control unit and printing unit of the central control unit of FIGURE 1 together with a rotary switching means of one of the individual control units.

In FIG. 4, the master control unit 180 is shown controlling a typical slave-switching unit 100 and the slave-printing unit 800. It should be noted that there is a slave-switching unit for each control unit. Whenever a signal is received from either the pushbuttons 992 (1–9) or the contacts 51*a* or 51*b* of the stepping switch 50 via the programming unit 990, the master control unit 180 transmits signals to all the slave-switching units 100 to 700 and the slave printing unit 800. All the slave-switching units 100 to 700, on receipt of the signals, couple the same group or combinations of controls associated with their control units to the indicia recorders 601 etc. (FIG. 1) in the central control unit. At the same time, the slave printing unit 800 aligns the proper identifier in the margin of the record sheet 66 so that the control manipulation indicia, recorded by operation of the controls by subjects, are identified.

The master control unit 180 (FIG. 4), the slave-switching units 100 to 700, and the slave printing unit 800 each include a rotary solenoid. The rotary solenoid has the property that upon receipt of a signal the rotary solenoid instead of linearly displacing a member in a straight line imparts a rotation to a shaft. The motion is stepwise and continues under the action of an interrupter mechanism until the selected positions are attained. During the transient interval when the switches are locating their correct positions, the delay circuit including relay 993 and capacitor 994 functions to prevent transient current impulses from incorrectly triggering the recorders 601, 611, etc.

More particularly, the master control unit 180 comprises a rotary solenoid 182 coupled to a shaft 184. The shaft 184 is coupled to the notched rotary contact 186 of the control deck 185, and to the tabbed rotary contacts, e.g., 188*a* and 188*b* of the subsidiary control decks, e.g., 189*a*, 189*b*. The notched rotary contact 186 is connected via the line 181 to the rotary solenoid 182 having a ground return. The solenoid 182 includes an interrupter mechanism to provide for pulsed operation. Whenever a current is transmitted along one of the lines 991 (1–9), the current passes through a contact, e.g., 187*a*, through the notched rotary contact 186 and the line 181, to the rotary solenoid 182, which rotates the shaft 184 causing the tabbed rotary contacts, e.g., 188*a* and 188*b* of the subsidiary control decks 189*a*, 189*b* to contact different of the fixed contacts 190. For example, if a signal is transmitted along the line 991–2 indicating that the *b* group of controls is to be selected, the rotary solenoid 182 is energized causing the rotation of the shaft 184 until the notched portion of the notched rotary contact 186 is opposite the fixed contact 187*b*. The current circuit to energize the rotary solenoid 182 is then broken. The rotation from contact to contact is of a pulsed type which is provided by the interrupter mechanism of the solenoid. At the end of rotation the tabbed rotary contacts 188*a*, 188*b* of the subsidiary control decks 189*a*, 189*b* are aligned with certain of the fixed contacts 190. The tabbed rotary contacts 188*a*, 188*b*, connected to the power source 46, transmit signals via certain of the lines 101 to 104, 201 to 204, etc., to the slave-switching unit 100.

In a typical slave-switching unit 100 the signals are received by fixed contacts, e.g., 69*a*, 69*b*, of the slave control deck 266. The signals are transmitted via the tabbed rotary contact 67 to the rotary solenoid 268 to cause rotation of the shaft 65. Coupled to the shaft 65 are the switching decks 64 of conventional design.

Each of the switching decks 64 (shown idealized) includes a plurality of fixed contacts responsive to control members and a rotary contact coupled to the control manipulation indicia recorder in the printing mechanism of the central control unit. Thus the groups or combinations of controls may be selectively coupled to the indicia recorders 601, etc. In the example cited, when the signal is transmitted along the line 991–2 causing the shaft 184 to assume the *b* position, the signals transmitted along the lines 101 to 104 energize the rotary solenoid 268 causing the shaft 65 to rotate, by virtue of the interrupter on the solenoid, until the circuits from the power source 46 via the subsidiary control deck 189 to the interrupter and rotary solenoid 268 are opened. The tabbed rotary contacts 188 and 67 are so phased and interconnected by the lines 101 to 104 that when the shaft 184 rotates a particular amount from its zero position, the shaft 65 rotates the same amount. Therefore, upon receipt of a signal from the line 991–2 calling for conditioning of the *b* group of controls by the master switching unit 180, the shaft 65 rotates to the *b* position causing the connection of rotary contact 60 to the fixed contact 60*b*, the rotary contact 61 to the fixed contact 61*b*, etc., in the slave switching unit 100. A similar set of connections is made in the remaining slave switching units 200 to 700. Thus all controls of the *b* group are conditioned for transmitting signals to the indicia recorders 601, etc.

The slave printing unit 800 at the same time receives signals from the master control unit 180 via the lines 801—804. These signals are transmitted from the fixed contacts 807 to the tabbed rotary contact 806 of the control deck 805. The signals are fed to the interrupter and rotary solenoid 810 which drives the shaft 812. The shaft 812 rotates until the circuits are opened. The shaft 812 is coupled to the printing disc 814 (FIG. 1), and the identifier associated with the *b* group of controls is aligned for printing on the record sheets 66 and 68.

Thus by adjusting the zero phasing of the shafts 184, 65 and 812 (FIG. 4), it is possible to coordinate their positions such that receipt of a signal on a particular line of the group 991 (1–9) causes the conditioning of the appropriate group of controls in all the control units, and selection of the related identifier to indicate which group of controls is being tested. Thus by using slave-switching units in each of the control units, a less expensive and more reliable group-selecting means is provided. There are not only fewer components but also a great reduction in the number of electrical connections between the central control unit and the individual control units. The use of rotary switches also provides for more reliable electrical connections which require less maintenance.

Figure 5:
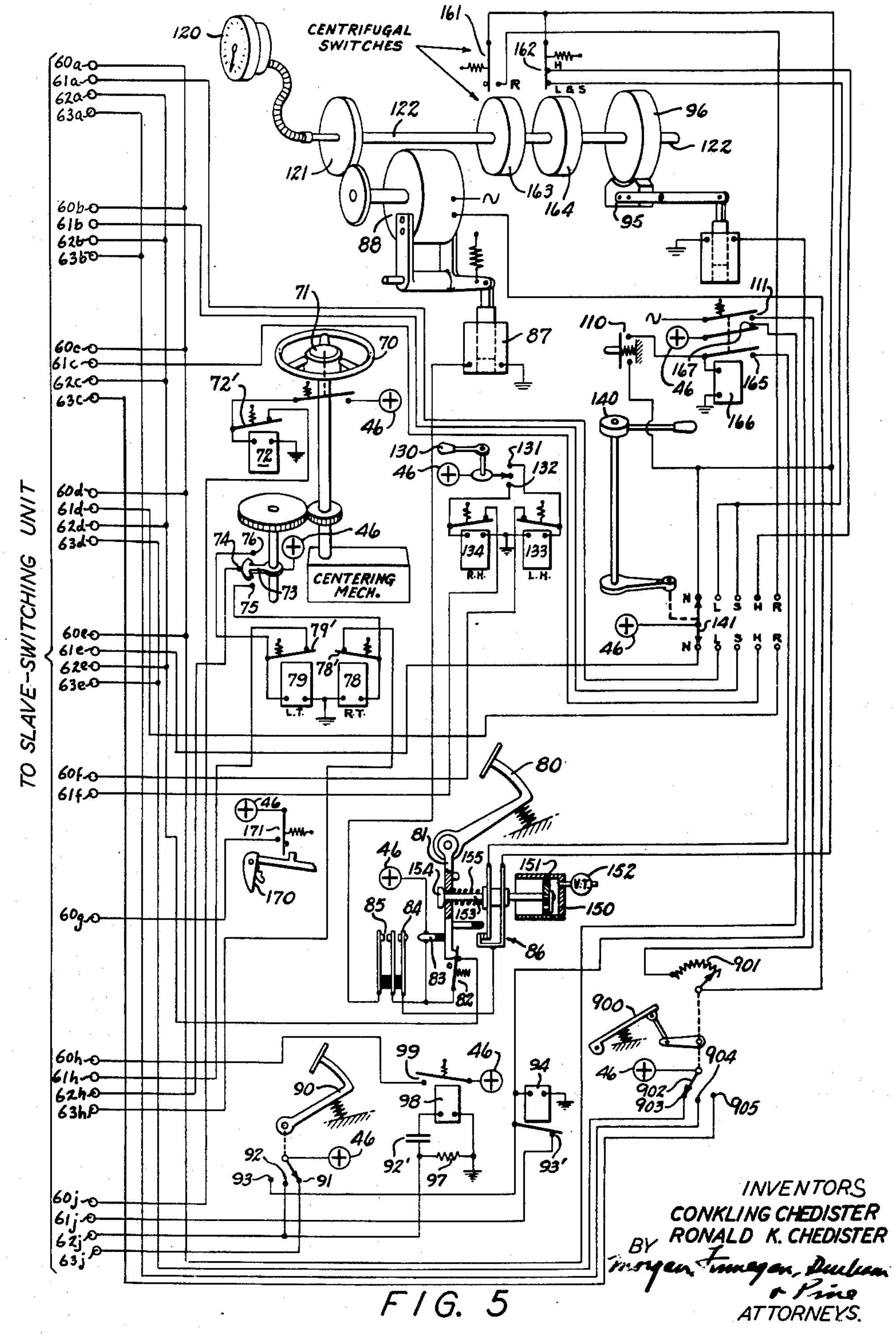
FIGURE 5 is a schematic wiring diagram of an individual control unit as shown in FIGURES 2 and 3.

FIG. 5 shows diagrammatically the various controls of an individual driver unit or control unit such as shown in their normal relation in FIG. 3. For training and testing an automobile driver for a conventional automobile, each individual control station would usually include a steering wheel 70, a clutch pedal 80, a brake pedal 90, an accelerator 900, a starting switch 110, a speedometer 120, a directional signal 130, a gear shift lever 140, a horn button 71, and a parking brake 170. Other controls may be added or others substituted, and may be connected to be operated in any desired sequence.

The horn button 71 is connected to close a delayed operated relay 72 which functions to open the associated contacts 72' after a short delay, thereby opening the circuit from the source 46 to the contact 60*j*. Before the relay 72 opens, the horn button energizes the associated indicia recorder. Relay 72 is provided as a delayed operating relay to prevent preenergizing before rotary contact 60 is connected to fixed contact 60*j* for the incident to be tested, thereby preventing a "correct" indication being produced by premature operation of the horn button 71.

Steering wheel 70 is connected by reduction gearing to a movable contact 73 which contacts with a central contact 74 in straightahead position, or with contact 75 or 76 as the wheel is steered to the right or left respectively, while it is returned to straightahead position and restrained against moving by the centering mechanism.

Contacts 75 and 76 are connected to transmit impulses to fixed contact 63*h* or 61*h* respectively, through delayed operated relays 78 and 79 which function in the same way as relay 72 to energize the associated marker magnet prior to opening of the associated contacts 78' and 79'. As with the horn 71, premature operation of the steering wheel does not produce a record.

Clutch pedal 80 is pivotally mounted and spring-returned to clutch engaged position. Connected to the clutch pedal and moved thereby is an arm 81 which on slight movement of pedal 80 actuates switch 82'; on further movement of the clutch pedal to disengaged position, arm 81 pushes contact plunger 83 against contact 84 to supply it with current from a power source 46, and also closes contacts 85. Switch 82, closed when the clutch is engaged (pedal released), supplies current to fixed contacts 62*a*, 62*b*, 62*c*, 62*d* and 62*e*. If desired the switch 82 can be arranged to operate a relay similar to relay 72 which in turn would momentarily, rather than continuously, feed current to contacts 62*a*, *b*, *c*, *d* and *e*, thus precluding premature operation. Contacts 83 and 84, on being closed, supply current to switch 86, the starting switch 110, and the centrifugal switches 163 and 164. Contacts 85, also closed when the clutch pedal is depressed, supply current from power source 46 to solenoid 87. Solenoid 87 rocks electric motor 88 into and out of driving engagement with a friction disc 121 on rotatable shaft 122.

Arm 81 is also adapted to actuate the piston 151 of a dash pot 150. The piston 151 of the dash pot is provided with a check valve allowing air to enter the dash pot freely as the piston is withdrawn, while preventing escape of air from the dash pot except through a regulable bleed valve 152. The piston rod 153 of the piston 151 is freely slidable in arm 81 but is moved by the arm by reason of the head 154, while the piston is returned by spring 155. Thus the rate of depressing the clutch pedal is immaterial and the dash pot cylinder 150 is charged with air. However, on moving the clutch pedal for engagement, spring 155 is compressed and the compression of the air in the dash pot can be felt by the subject in the "feel" of the clutch. Excessively rapid engagement of the clutch ahead of the bleed of air by valve 152 causes spring 155 to be compressed excessively, and thereby allows contacts 86 to be opened. If this opening of contacts 86 occurs, the circuit from power source 46 via contacts 83, 84 and 86 to the contact 165 of holding relay 166 is broken. The holding relay 166 is normally held closed by contact 165 after being initially closed by momentary closure of the starting switch 110, the latter connecting the power source 46 to the holding relay 166 via the neutral position of the gear shift lever if the shift is in neutral, or via the contacts 83 and 84 if the clutch pedal is depressed (clutch disengaged). Thus too rapid engagement of the clutch opens contacts 86 and breaks the holding circuit of relay 166, and deenergizes the relay, requiring restarting of the cycle by pressing switch 110. Holding relay 166, supplied current through contact 165 maintains closed the contacts 167 to complete a circuit from source 46 through contact 167 to contacts 60*a*, 60*b*, 60*c*, 60*d* and 60*e*, to cause an actuation of recorders 601, 602, 603, etc. only if that circuit is energized at that time through stepping switch 50, thereby indicating that the operator did not stall.

Brake pedal 90 is pivotally mounted and spring-returned to "brake disengaged" position. Brake pedal 90 carries a movable contact adapted to supply power from a source 46 to a "brake disengaged" contact 91, a "service braking" contact 92 or an "emergency stop" contact 93 corresponding to full braking effort. Contact 91 is connected to fixed contact 63*j*, and contact 92 to fixed contact 62*j*. Contact 93 is connected to energize a delayed action relay 94 to open contact 93', thereby interrupting the supply of current to fixed contact 61*j* and also energizing solenoid actuated brake 95, to eventually stop flywheel 96 and shaft 122 on which it is mounted to be driven by motor 88. Each time brake pedal 90 is depressed to close contact 92, condenser 92' is charged, and when the rate of charging exceeds the current leak through high resistance 97, relay 98 is energized to close contact 99, thereby supplying current to fixed contact 60*h*, corresponding to a feathering action of the brake pedal, or repeated light applications, such as is desirable in driving on slippery ice.

The accelerator pedal 900 is normally spring-returned to idling position. Accelerator pedal 900 actuates a variable resistance 901 so that the further it is depressed the more resistance is cut out of the circuit by which alternating current is supplied to motor 88, while holding relay 166 is engaged. The motor 88 is preferably connected to drive audible means simulating the sound of an automobile engine. Accelerator pedal 900 also moves a movable contact 902 adapted to engage contacts 903, 904 or 905 in idle, slightly open or open-throttle positions. Contact 903 is connected to fixed contacts **63*d* and 63*e*, contact 904 to fixed contacts 63*a* and 63*b*, and contact 905 to fixed contact 63*c*. Thus the accelerator pedal 900 must be returned to idle position when the gear shift lever is to be in neutral or reverse; must be in a normally open position in second-speed or low-gear driving; and must be more fully opened in high gear when its position is to be checked through selection of the proper contacts on the stepping switch 50**.

Starter switch 110 is conveniently mounted on the dash panel of each individual control unit and is adapted to cause actuation of the gang relay 166. Switch 110 supplies power to the coil of relay 166 from a power source 46 when the clutch pedal is depressed to engage contacts 83 and 84, thereby supplying current to the switch 110. When coil 166 has been energized, contact 165 is closed, thereby holding the circuit closed until the operator mistakenly engages the clutch too fast or the film cycle is completed. Relay 166 also includes a contact 111 through which alternating current is supplied to motor 88 under control of the accelerator-controlled resistor 901.

Speedometer 120 simulates a conventional speedometer and is calibrated with the audible effects produced by the motor 88, as well as with the speed of travel depicted by the film 20 as it is projected. Thus an indicated speed of 25 m.p.h. on the speedometer 120 would be the proper motor speed for road travel of 25 m.p.h. as depicted by the motion picture speed. Such a motor speed would be produced by positioning the accelerator pedal 900 so that contact 905 was closed and resistor 901 produced a speed in motor 88 of about 1400 r.p.m. Speedometer 120 is driven by shaft 122 from motor 88 and under control of brake 95.

Directional signal switch 130, a single-pole double throw switch mounted on the steering column, has a left-turn contact 131 and a right-turn contact 132. Closure of contact 131 supplies current to delayed operated relay 133, and contact 132 to delayed operated relay 134. Each relay 133 and 134 energizes the recorder armature before opening. The delayed operating relays 133 and 134 avoid the possibility of a record being made by premature operation of the directional signal control.

Shift lever 140, also mounted on the steering column, is provided with positions corresponding to reverse, neutral, first, second and third gear ratios. Movement of the shift lever 140 moves a contact member 141 connected to a power source 46 to simultaneously supply current selectively to the contacts N, L, S, H and R (neutral, low, second, high and reverse) in pairs.

In the neutral position, contact 141 supplies power to contacts N, one of which may supply power to relay 166 on closure of switch 110, and also to fixed contact **61*e***.

In first or low-speed position, contact 141 supplies power to contacts L, one of which is connected to fixed contact **61*a* while the other supplies current to the contact L&S of centrifugal switch 162 which is controlled by the motor speed. If the clutch 90 is properly moved while engaging, switch 86 remains closed, and with the accelerator depressed to give a particular range of speed of motor 88, the contacts of switch 162 remain closed. Otherwise switch 86 or 162 is open to interrupt the power to contact 165 and deenergizing relay 166 to stall motor 88. If the shift lever is moved out of the neutral position without disengaging the clutch, the alternate power connection to holding relay 166 via power source 46, contacts 83, 84, 86 and 165**, is not completed and the motor will stall.

Centrifugal switches 161 and 162 are actuated by centrifugal control members 163 and 164 respectively, so adjusted that the switches are selectively closed only over appropriate speed ranges of shaft 122 from motor 88 under control of the clutch pedal 80 and the accelerator pedal 900.

In second-speed position, contact 141 supplies current to the pair of contacts S, one of which is connected to fixed contact **61*b* while the other is connected to contact L&S of centrifugal switch 162, and improper coordinated operation of the clutch 80 and accelerator 900** will result in a motor stall.

In high-speed position, contact 141 supplies current to the pair of contacts H, one of which is connected to contact **61*c* while the other is connected to contact H of switch 162, so that improper operation stalls the motor 88**.

In reverse, contact 141 supplies current to the pair of contacts R, one of which is connected to contact **61*d* while the other is connected to contact R of switch 161. This centrifugal switch 161 is set so that contact R is open unless the centrifugal control 163 indicates a dead stop of shaft 122**.

A parking brake 170 causes a normally open switch 171 to be closed when the brake is set, thereby supplying current to fixed contact **60*g***.

In the embodiment shown, and connected as shown, several fixed contacts are dead and not used, but might be connected to other control members if that were desired.

Actuation of the rotary stepping switch 50 (FIG. 1) by impulses applied to the solenoid 48, or by manually pushing on button 39, causes signals to be sent via the programming unit 990 and the master control unit 180 to the slave-switching units 100—700 to selectively condition groups of controls for recording their operation. The opaque portions 22 are preferably so spaced on the film 20 that the rotary contact members 52 rests on the even contacts of switch 50 for a short period, for instance 2.0 to 10.0 seconds, the period being determined by the spacing between the portions 22. Thus, in starting, a suitable stimulus presented by the film 20, such as verbal instructions, call for starting and shifting into low gear. As the film 20 is projected, an opaque spot 22 advances contact 51 to the second contact, thereby moving the rotary contacts in the slave-switching means to position A to condition control group *a*. The subject must then push the starting switch 110 with the clutch pedal 80 depressed or with the gear shift lever 140 in neutral, which energizes 601 (or 602 etc.), in the following manner: The circuit from power source 46 through the neutral position of the gear shift switch 141 (FIG. 5) to the starter button 110, or from the power source 46 through contacts 83 and 84 of the clutch mechanism 80 to the starter button 110, causes the actuation of relay 166 when the starter button is depressed. Energization of the relay 166 completes a circuit from power source 46 through contacts 167 of relay 166 to terminal **60*a* of the slave-switching units 100—700 (FIG. 4). As previously indicated the shaft of the slave-switching unit is in position A; thus the rotary arm 60–1 of slave-switching unit 100 contacts terminal 60*a* connecting the above-described circuit to recorder 601 (FIG. 1). The subject must then shift lever 140 to first speed to energize recorder 611 as follows: Current from power source 46 is connected via the lower contact L of gear shift switch 141 (FIG. 5) to terminals 61*a* of the slave-switching units 100—700 (FIG. 4). Since the slave-switching units are in position A, the rotary arm 61–1 of slave-switching unit 100, for example, contacts terminal 61*a* to connect the above-described circuit to the recorder 611. It should be noted that this only indicates the movement of the gear shift 140 to the L (low) position. This must be accompanied by the disengagement of the clutch pedal 80; otherwise the motor 88 will stall, the stall being indicated at recorder 601 as described above. After shifting, the subject must engage the clutch properly by actuation of clutch pedal 80, and open the throttle by pedal 900, thereby energizing recorders 621 and 631 respectively, in the following manner: Recorder 621 is energized by current received from power source 46 via contacts 82 on clutch pedal 80 (FIG. 5), terminal 62*a* and rotary contact 62–1 (FIG. 4); and recorder 631 is energized by current received from power source 46 via contacts 902 and 904 on accelerator pedal 900 (FIG. 5), terminal 63***a* and rotary contact 63–1 (FIG. 4). If these operations are not all properly completed within a given period, such as 5 or 10 seconds, another spot 22 actuates stepping switch 50 to move rotary contact 52 away from the second contact and onto the third contact, causing the record sheet 66 to be fed to test No. 2.

The *b*-position contacts of the slave switching units similarly cause actuation of recording solenoids 601, 611, 621 and 631 from control unit No. 1, as the film in test No. 2 calls for shifting into second speed provided the operations are performed during the period when the slave-switching units are in *b*-position.

The *c*-position contacts similarly record shifting into third or high-gear ratio; the *d*-position contacts, into reverse; the *e*-position contacts, shifting into neutral.

The *f*-position contacts for the directional signal operation may be used in connection with verbal stimuli, or without verbal instruction. For instance, the motion picture may depict the approach to a oneway street which requires a right or left turn; and the *f*-position contacts may be energized several seconds before steering is finally required and as soon as it becomes apparent from the projected scene that a turn will be necessary, and may be deenergized just before the turn is necessary, so that the subject is scored for correct operation only if the switch 130 is moved in the proper period.

The *g*-position contacts are similarly selected and will record operation of the parking brake 170; while the *h*-position contacts record steering through fixed contacts 61*h*, 62*h* and 63*h*, and correct slippery-weather brake operation through contact 60*h*.

The *j*-position contacts record horn and brake operation. Closure of switch 71 causes an impulse to be transmitted to solenoid 601 through fixed contact 60*j*, while solenoids 611, 621 and 631, energized through fixed contacts 61*j*, 62*j* and 63*j*, record the operations of brake with maximum force, with normal force, and no-brake operation respectively.

Of course operations by the individual at control unit No. 2 will cause actuation of recording solenoids 602, 612, 622 and 632, and at unit No. 6 of solenoids 606, 616, 626 and 636.

The several control units are connected to the central control and recording unit 14 by means of multiple conductor cables 200′ which include the various individual conductors as shown between the units in FIGS. 1 and 5, while the wiring shown in FIG. 5 preferably forms a part of each control unit.

When used without motion picture film, the desired stimuli may be presented orally or by the slide projector 12, the paper or record sheet 66 may be fed manually and the groups of controls called for may be selectively actuated by switches 992; the period for operation of the appropriate controls may then be determined at the will of the instructor. In such manual control, the switch 54 is moved to its other position than as shown.

For operation in sequence as determined by the film, the order may be changed by varying the connection of the switch 50 to the master control 180 by use of the programming unit 990. As an extreme example, all of the even contacts of switch 50 might be connected to the same line for intensive drill in one operation.

The present invention thus provides a relatively unique mechanism for the correct and accurate training of students in the manipulation of the various control members, recording whether or not these members are correctly operated, and identifying the recordings. By the apparatus a large number of students may be simultaneously taught and drilled, their individual progress noted, and their level of skill gradually advanced until the required proficiency is obtained.

The invention in its broader aspects is not limited to the specific mechanisms shown and described, but departures may be made therefrom within the scope of the accompanying claims without departing from the principles of the invention and without sacrificing its chief advantages.

What we claim is:

1. Apparatus for recording indicia related to the operation of controls by a subject in response to each of a series of situations comprising stimuli-generating means for generating stimuli related to the situations; a plurality of control operation sensing means responsive to the operation of said controls for sensing the operation thereof by the subject in response to stimuli; switching means for selecting certain of said control operation sensing means; a master control means responsive to said stimuli-generating means, said master control means controlling said switching means to select said certain control operation sensing means; indicia recording means responsive to said switching means and said control operation sensing means to record indicia upon operation of the associated control; and indicia identifying means responsive to said master control means to relate the recorded indicia to the operated control.

2. Apparatus for recording a subject's manipulation of controls in response to a sequence of situations comprising control sensing means responsive to the operation of the controls for sensing the operation thereof; indicia recording means responsive to said control sensing means; indicia identifying means for identifying indicia; and master switching means, said master switching means activating predetermined combinations of said control sensing means whereby the manipulation of a control associated with an activated control sensing means directs said indicia recording means to record an indicium, said master switching means also activating said indicia identifying means to identify the recorded indicium.

3. The apparatus of claim 2 wherein said control sensing means includes a rotary switch, and said master switching means transmits signals during each situation to rotate said rotary switch to a predetermined position.

4. In a driver trainer for instructing a group of trainees in the manipulation of controls in response to different driving conditions, apparatus for recording the response of each trainee to each of a plurality of driving conditions comprising stimuli-generating means for generating stimuli for each of the driving conditions; a plurality of trainee units each including controls operable by a trainee in response to a driving condition; a plurality of sensing means in each trainee unit responsive to and for sensing the operation of said controls; indicia recording means for recording indicia upon receipt of an indication from a sensing means, said indicia indicating that the associated control is being operated; switching means in each of said trainee units for coupling one of said sensing means to said indicia recording means; a master control means responsive to said stimuli-generating means for controlling each switching means in the selection of a predetermined sensing means in response to the particular driving condition being simulated; and indicia identifying means responsive to said master control means to identify the recorded indicia.

5. The apparatus of claim 4 wherein said indicia identifying means includes a rotary member with a plurality of indicia identifications angularly displaced from each other on said rotary member, and a rotational drive means for rotating said rotary member in response to said master control means.

6. In a driver trainer which tests for the operation of predetermined controls by a subject in response to each of a plurality of situations, apparatus for identifying and recording the operation of controls comprising a record sheet; a plurality of first printing means responsive to the controls, each of said printing means printing a mark on said record sheet upon operation of one of the controls; a control identification means, said control identification means including a plurality of combinations of characters, each of said combinations identifying a control; means for selecting the combinations associated with the predetermined controls; and second printing means for printing on said record sheet the selected combinations, said first and second printing means being disposed such that on said record sheet each printed combination identifies its associated mark.

7. In a driver trainer for testing a subject response to simulated driving situations from a simulator, apparatus for recording and identifying the subject's manipulation of controls comprising a plurality of printing means for printing characters, each of said printing means being selectively operable by the operation of a control during a simulated driving condition; a record medium upon which characters are printed; a disk, said disk having combinations of characters in each of a plurality of sectors, each of said combinations being related to predetermined controls associated with a simulated driving situation; a shaft coupled to said disk; a rotary solenoid for rotating said shaft to position a sector to print a combination of characters on said record medium identifiably disposed with respect to the characters printed by said printing means, said rotary solenoid being energized by the simulator to position for printing the sector related to the simulated driving condition.

8. In driver training apparatus for testing a subject's reaction to a series of driving situations by the operation of a plurality of controls; a simulation means for simulating each of the situations; a switching means responsive to said simulation means; a plurality of sensing means responsive to the operation of the controls, said switching means sequentially activating said sensing means in response to each simulated situation; and programming means in the circuit which includes said switching means and said sensing means for changing the sequence of activation of said sensing means by said switching means, said programming means having a circuit connecting configuration established according to the desired sequence.

9. In driver training apparatus for testing a subject's reaction to a series of driving situations by the operation of a plurality of controls, a simulation means for simulating each of the situations; a stepping switch having an input means and a plurality of output means; a source of power, said input means being coupled to said source of power; a plurality of sensing means energized by said source of power for respectively sensing the operation of the controls, said sensing means being respectively coupled to the output means of said stepping switch; means responsive to said simulation means for sequentially switching the input means of said stepping switch to successive output means of said switch as said simulation means simulates successive situations to successively activate each of said sensing means; and programming means in the circuit coupling said output means to said sensing means for changing the sequence of activation of said sensing means by said stepping switch, said programming means having circuit connecting means disposed according to the desired sequence.

10. The apparatus of claim 9 wherein said stepping switch includes a plurality of banks, each having a plurality of output means and an input means; and a power-switching means for selective coupling of said source of power to the input means of the plurality of banks.

11. The apparatus of claim 9, including indicia recording means responsive to said sensing means for recording indicia indicating the operation of controls.

12. The apparatus of claim 11, including means for printing identifiers in association with the recorded indicia.

13. Apparatus for testing a subject's reaction to a series of situations by the operation of a plurality of controls comprising a simulation means for simulating each of the situations; a plurality of sensing means for respectively sensing the operation of the controls; a sequential switching means responsive to said simulation means for transmitting sequential control signals to a programming means, said programming means transferring the control signals to a first predetermined combination of sensing means, said programming means being manually variable to transfer the sequential control signals to a second predetermined combination of said sensing means to thereby effectively change the sequence of energization of said sensing means.

14. Apparatus for testing a subject's reaction to a series of situations by the operation of a plurality of controls comprising: a simulation means for simulating each of the driving situations; a source of power; a stepping switch responsive to said simulation means, said stepping switch having an input means being coupled to said source of power; a plurality of sensing means energizable by said source of power; and a programming unit for controlling the sequence of energization of said sensing means, said programming unit having a plurality of input means coupled to the plurality of output means of said stepping switch, a plurality of output means coupled to said plurality of sensing means and a plurality of interconnection means for interconnecting its input means to its output means, said interconnection means being interchangeable to permit varying of the sequence of energization of said sensing means.

15. Apparatus for training persons in the operation of controls including in combination means for presenting a sequence of stimuli to a group of persons to be trained, recording means, a plurality of stations each having a plurality of control members to be actuated selectively by the persons being trained in response to the stimuli, said recording means including means for separately recording the control operations of each of the persons, control operation sensing means responsive to the operation of the controls, means interconnecting said sensing means and said recording means and actuated by said stimuli presenting means in timed relation with the stimuli for selecting and connecting certain components of said control operation sensing means at each station with the respective recording means for a limited period whereby the recording means records the person's operation of the controls to which said selected components of said sensing means respond, and means for adapting the apparatus to any desired program of stimuli comprising programming means connected to said selecting and connecting means and having an interchangeable member adapted to permute the interconnection provided by said selecting and connecting means.

16. Apparatus according to claim 15 in which said programming means includes an interchangeable multi-contact electrical connector which controls said interconnections provided by said selecting and connecting means.

17. Apparatus according to claim 15 in which said recording means includes indicia identification means responsive to said selecting and connecting means and adapted to identify the output of said recording means.

18. Apparatus for training persons in the operation of controls including in combination means for presenting a sequence of stimuli to a group of persons to be trained, recording means, a plurality of stations each having a plurality of control members to be actuated selectively by the persons being trained in response to the stimuli, said recording means including means for separately recording the control operations of each of the persons, control operation sensing means responsive to the operation of the controls, means interconnecting said sensing means and said recording means and actuated by said stimuli presenting means in timed relation with the stimuli for selecting and connecting certain components of said control operation sensing means at each station with the respective recording means, for a limited period whereby the recording means records the person's operation of the controls to which said selected components of said sensing means respond, and means included in said recording means for extending the capacity of said apparatus to accommodate varied permutations and combinations of stimuli comprising indicia identifying means including indicating means, said identifying means being responsive to said selecting and connecting means for identifying the output of said recording means.

19. Apparatus according to claim 18 in which said indicia identifying means includes an electro-mechanical receiver responsive to said selecting and connecting means.

20. Apparatus according to claim 18 in which said indicating means includes characters indicative of control manipulations.

21. Apparatus for training persons in the operation of controls including in combination means for presenting a sequence of stimuli to a group of persons to be trained, recording means, a plurality of stations each having a plurality of control members to be actuated selectively by the persons being trained in response to the stimuli, said recording means including means for separately recording the control operations of each of the persons, control operation sensing means responsive to the operation of the controls, means actuated in timed relation with the stimuli for selectively connecting certain components of said control operation sensing means at each station with the recording means for a limited period whereby the recording means records the operation of the controls to which said selected components of said sensing means respond comprising a rotary transmitter actuated by said stimuli presenting means in accordance with said stimuli and rotary connecting means at each station responsive to said transmitter and operative to couple said selected components of said control operation sensing means to said recording means.

22. Apparatus according to claim 21 in which said recording means includes indicia identifying means having a receiver responsive to said transmitter for supplying identification of the recorded data.

23. Apparatus according to claim 22 in which said transmitter is responsive to signals generated in accordance with said stimuli, said signals being coupled to said transmitter via a programming unit having an interchangeable member adapted to control the response of said transmitter to said signals.

References Cited in the file of this patent

UNITED STATES PATENTS

| | | |
|---|---|---|
| 2,088,264 | Heinis | July 27, 1937 |
| 2,260,432 | Brown | Oct. 28, 1941 |
| 2,269,444 | Durham | Jan. 13, 1942 |
| 2,273,091 | De Silva | Feb. 17, 1942 |
| 2,341,312 | Chedister | Feb. 8, 1944 |
| 2,396,857 | Kittredge | Mar. 19, 1946 |
| 2,659,164 | Durham | Nov. 17, 1953 |
| 2,700,227 | Arkell | Jan. 25, 1955 |
| 2,715,783 | Chedister | Aug. 23, 1955 |
| 2,814,131 | Sheppard | Nov. 26, 1957 |